Oct. 4, 1960 W. J. CRAVEN ET AL 2,954,710
METHOD AND APPARATUS FOR PRODUCING SAW BLADES
Filed May 22, 1957 5 Sheets-Sheet 1
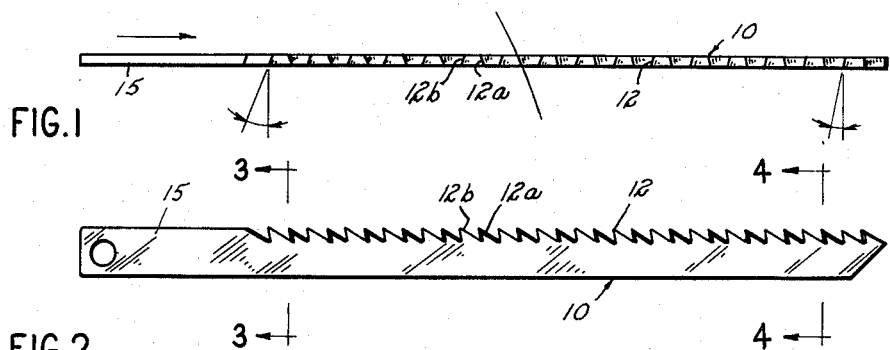
FIG.1
FIG.2
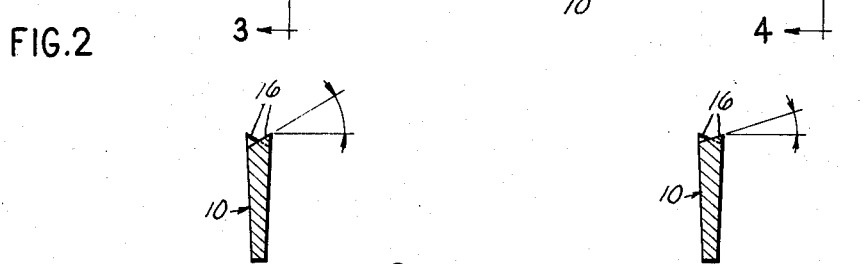
FIG.3 FIG.4
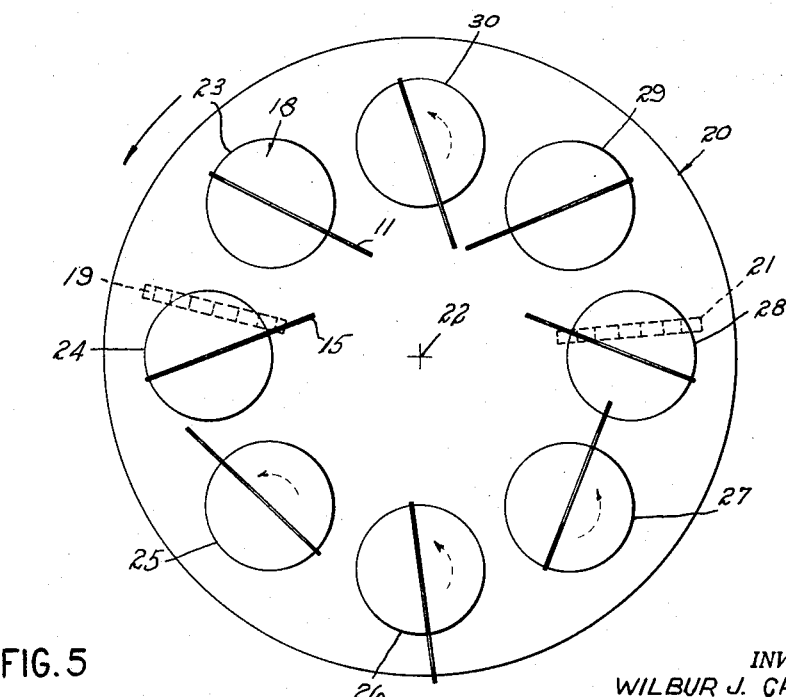
FIG.5
INVENTORS
WILBUR J. CRAVEN
BY HUBERT MUECK
Lindsey and Prutzman
ATTORNEYS INVENTORS
WILBUR J. CRAVEN
HUBERT MUECK
BY
Lindsey and Pritzman
ATTORNEYS Oct. 4, 1960   W. J. CRAVEN ET AL   2,954,710
METHOD AND APPARATUS FOR PRODUCING SAW BLADES
Filed May 22, 1957   5 Sheets-Sheet 3

INVENTORS
WILBUR J. CRAVEN
HUBERT MUECK
BY Lindsey and Pritzman
ATTORNEYS

Oct. 4, 1960 W. J. CRAVEN ET AL 2,954,710
METHOD AND APPARATUS FOR PRODUCING SAW BLADES
Filed May 22, 1957 5 Sheets-Sheet 4

INVENTORS
WILBUR J. CRAVEN
BY HUBERT MUECK

Lindsey and Prutzman
ATTORNEYS

Oct. 4, 1960   W. J. CRAVEN ET AL   2,954,710
METHOD AND APPARATUS FOR PRODUCING SAW BLADES
Filed May 22, 1957   5 Sheets-Sheet 5

INVENTORS
WILBUR J. CRAVEN
BY HUBERT MUECK

Lindsey and Prutzman
ATTORNEYS

United States Patent Office 2,954,710
Patented Oct. 4, 1960

2,954,710

METHOD AND APPARATUS FOR PRODUCING SAW BLADES

Wilbur J. Craven, East Hartford, and Hubert Mueck, South Coventry, Conn., assignors to Capewell Manufacturing Company, Hartford, Conn., a corporation of Connecticut Filed May 22, 1957, Ser. No. 660,832

5 Claims. (Cl. 76—112)

This invention relates to a novel and improved method of producing saw blades of the type wherein next adjacent teeth are fleamed in opposite directions; and to novel and improved apparatus for fabricating such a blade.

The manufacture of saw blades of the type described and particularly those in which the teeth are provided with a positive rake has heretofore usually been limited to such methods as machine or hand filing. These methods normally require the forming of one tooth at a time and involve considerable labor, resulting in a relatively high cost of manufacture. The manufacture of such blades by mass production methods has, thus, heretofore been impracticable.

Accordingly, it is an object of this invention to provide a novel and improved method of producing saw blades of the type described which is adaptable to the mass production of such blades with a relatively high degree of accuracy and at a relatively low cost.

It is further an object of this invention to provide a method, as described, by means of which a saw blade, of the type described, having positively raked teeth may be produced at no increase in cost.

It is still further an object of this invention to provide such a method by means of which may be produced a blade, of the type described, wherein the fleam angle of the teeth of the blade progressively varies from one end of the blade toward the other.

It is another object of this invention to provide novel and improved apparatus for the manufacture of a blade, of the type described, which is adapted to be used in conjunction with a variety of machines; by means of which blades of the type described may be produced with a relatively high degree of accuracy; which is adapted for semi-automatic mass production operation; and which will provide trouble-free usage over extended periods of operation.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is an edge view of a blade of a type with which this invention is concerned;

Fig. 2 is a side elevational view of the blade of Fig. 1;

Fig. 3 is an enlarged cross sectional view along the line 3—3 of Fig. 2;

Fig. 4 is an enlarged cross sectional view along the line 4—4 of Fig. 2;

Fig. 5 is a diagrammatic view illustrating one embodiment of the method of this invention;

Figure 7:
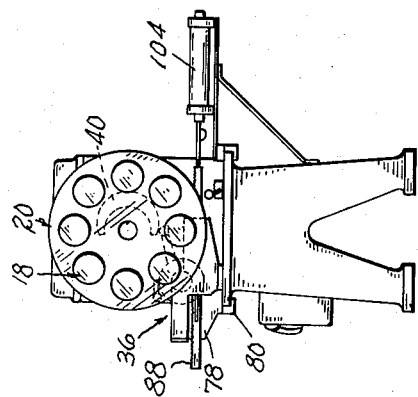
Fig. 7 is an end view of the lathe with the tool assembly removed.

With reference to Figs. 1 and 2 of the drawings, there is shown a saw blade 10 exemplary of the type of blade with which this invention is concerned. The blade 10 has a plurality of fleamed cutting teeth 12, all facing in same direction with each tooth having a positive rake and with next adjacent teeth being fleamed in opposite directions. The blade is preferably formed of tool steel which must be machined in the annealed state and in which state has a relatively low resistance to bending and deformation.

The method of this invention, for fabricating such a blade, comprises passing an elongated blade blank and an elongated form cutter, having formed cutting edges for notching the blank, transversely of each other to form the faces of the teeth 12a which are fleamed in one direction and at the same time to form the backs of the teeth 12b which are oppositely fleamed. For reasons which will be hereinafter apparent, it is preferred that only a slight cut be taken on the first pass, thus requiring additional passes and feeding of the blank toward the cutter in order to obtain the desired depth of cut. The blank is fed relative to the cutter for depth of cut in a direction parallel to the face of the tooth form desired in order to obtain the desired rake. Following each passing of the blank by the aforementioned cutter, the blank and a second form cutter, similar to the first, but having teeth for cutting notches in the blank forming the positively raked faces of the teeth 12b and backs of the teeth 12a, are passed transversely of each other. As in the case of the first cutter, it is preferred that the second cutter take only a slight cut on each pass. The blank is then again passed by the first cutter, and the cycle is repeated until the desired tooth form is achieved.

It is preferred that the blank be offset from each cutter a predetermined angular distance during engagement therebetween in order that the cutters will sequentially cut notches along the blank one at a time rather than cutting all the notches at once. The taking of only a slight cut on each pass and the sequential cutting of the notches along the blank reduces the power required for cutting, but even more importantly, prevents severe deformation or collapse of the blank of annealed tool or carbon steel which would occur on the second pass if a full cut were made on the first pass.

In accordance with the invention, it is further preferred that the angle which the blank and cutters are offset be varied during the cutting operation so that the fleam angle of the teeth will be varied progressively from one end of the blade toward the other. For example, in a sabre saw blade, such as shown in Fig. 1, it is preferred that the fleam angle increase from tip to shank as shown in Fig. 1. This variation in fleam angle will, in a blade of the type described, result in a progressive decrease from tip to shank of the angle between next adjacent cutting edges 16 as shown in Figs. 3 and 4. With this variation in the angle between next adjacent cutting edges, when the blade is moved relative to a piece of work in a direction of the arrow of Fig. 1, the cutting edges will tend to move out of engagement with the bottom of the kerf to reduce resistance to forward feeding of the blade on the back stroke; further, upon reversal of blade movement, it can be seen that the portion of each cutting edge which engages the bottom of the kerf will be reduced as the blade moves through the kerf to provide a progressive reduction in loading on the blade toward the tip during the cutting stroke and thus tend to reduce vibration of the blade and permit faster cutting speed.

A diagrammatic view of a specific form of apparatus for practicing the above described method is illustrated in Fig. 5 wherein a blade blank 11 is mounted on a fixture or vise 18 which is in turn rotatably mounted on a support or chuck body 20 which is rotatable about an axis 22. A pair of form cutters 19, 21 having a plurality of cutting edges extending laterally thereof are fixed relative to the chuck 20 and each lie on a radius from the chuck axis. The vise 18 is shown in a plurality of positions 23–30 corresponding to a plurality of rotated positions of the chuck 20. Additionally, the vise 18 is shown in a plurality of rotated positions relative to the chuck 20.

As can be seen from Fig. 5, the vise is in the same rotated position relative to the chuck, during chuck rotation, in a counterclockwise direction as viewed in Fig. 5, between the positions 23 and 24 of the vise. In the specific embodiment the blank 11, when the vise is in the rotated position 23, is angularly displaced counterclockwise at an angle of approximately 20° to the radius of the chuck passing through the axis of the vise. In this manner, the blank will be disposed at an average angle of 20° with the longitudinal axis of the cutter during engagement therebetween. This angularity of disposition of the blank and cutter, during engagement, will result in the cutter engaging the blank first at the point farthest from the shank 15 of the blade, which extends inwardly of the chuck axis, and then sequentially along the blank toward the shank.

Inasmuch as the blank is being moved in an arc about the axis 22 during engagement with the cutter, the portions of the blank farthest from the axis of the chuck will be presented to the cutter at an angle which is less than the angle of presentation of the portion of the blank nearest the axis of the chuck. Thus, the desired variation in fleam angle of the teeth is acquired without the necessity of indexing the blade relative to the chuck during the cutting operation.

Subsequent to engagement of the blank with the cutter 19 and during rotation of the chuck between the vise positions 24 and 28, the vise 18 is rotated relative to the chuck in a counterclockwise direction an angular distance sufficient to present the blank to the cutter 21 offset from the cutter at the same angle as it was offset from the cutter 19, but in a clockwise direction. In the specific embodiment, the angular indexing of the blade blank is approximately 320°, so that when the vise is in the relatively rotated position 26, the blade blank is angularly displaced from the cutter 21 clockwise at an angle of approximately 20°. The cutter 21 will then cut notches sequentially along the blade as in the case of the cutter 19, but with the cutter engagement being from shank to tip and at an angle laterally of the blank opposite the cutting angle of the cutter 19.

Figure 10:
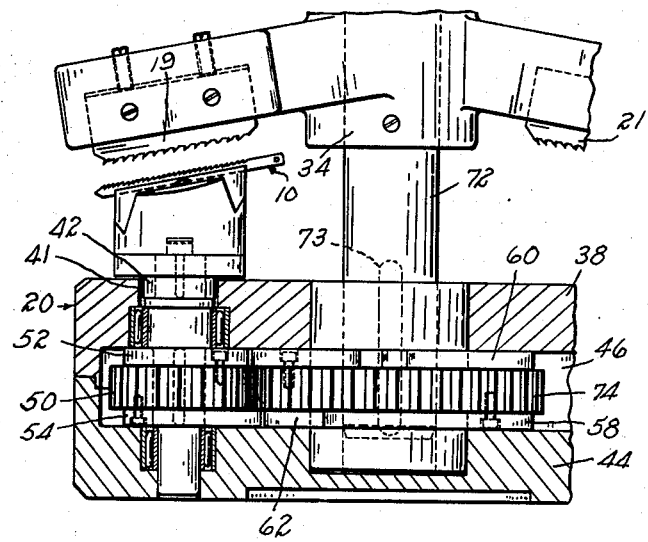
Fig. 10 is an enlarged fragmentary top view of the chuck and work forming tool assembly of Fig. 6 with the chuck partially sectioned.

Subsequent to engagement with the cutter 21, the vise 18 is angularly indexed in a counterclockwise direction into its relatively rotated position 23 whereby the blank will be in the desired angular relation relative to the cutter 19 preparatory to the next engagement therewith. In the specific embodiment, this angular indexing of the vise takes place between positions 29 and 23 of the vise and is approximately 40°. Subsequent to engagement of the blank with the cutter 21 and prior to the engagement with the cutter 19, the cutters are fed toward the blank a predetermined increment corresponding to the depth of cut for each pass. As shown in Fig. 10, the cutters and blank are angularly displaced, an equal amount, out of the plane of rotation of the chuck in order to achieve the positively raked teeth desired, in a plurality of passes.

It should be here noted that during blank and cutter engagement, the arcuate movement of the blank with the chuck and relative to the cutter results in the faces of the teeth being slightly arcuately formed as indicated in Fig. 1. The extent of curvature of the faces will be related to the spacing of any one tooth from the axis of the chuck. This curvature of the tooth face provides a somewhat "hollow ground" tooth form which extends the service life of the blade as well as providing superior cutting action.

Figure 6:
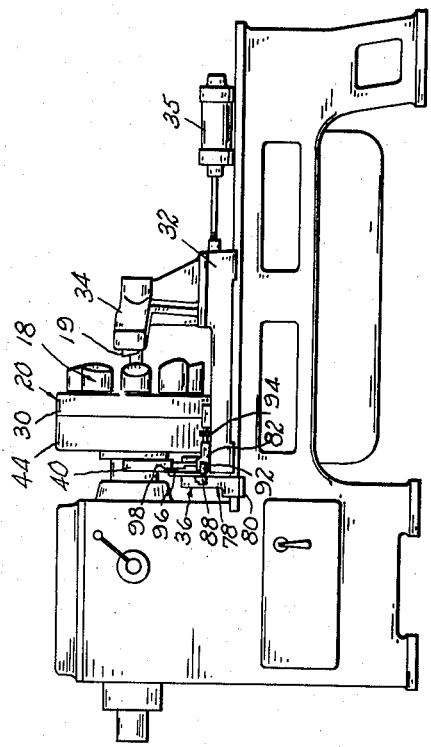
Fig. 6 is a side elevational view of a lathe on which is mounted a work holding chuck, a work forming tool assembly and a tool feed control mechanism constructed in accordance with the invention.
Figure 8:
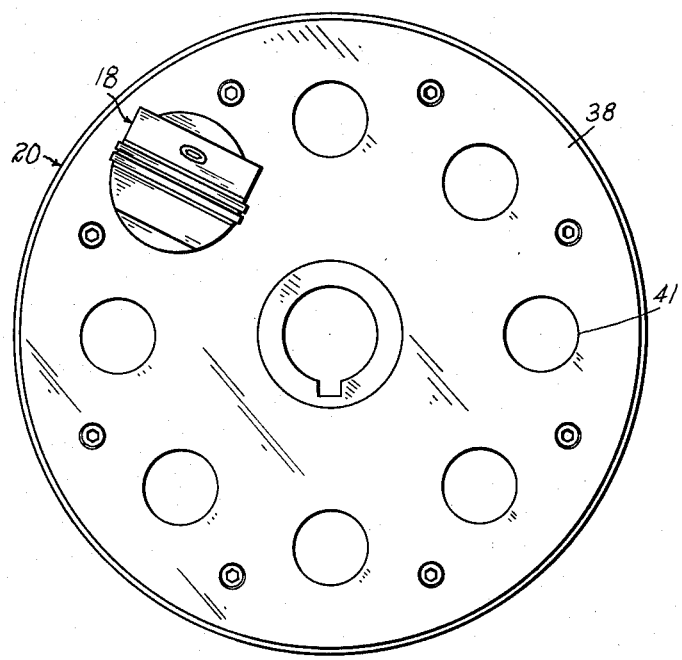
Fig. 8 is an enlarged front elevational view of the chuck of Fig. 6 with certain of the parts omitted.

Turning now to a detailed description of the apparatus of the invention, the chuck 20 is shown in Figs. 6 and 7 mounted on the faceplate of a lathe having a sliding saddle 32 movable in a direction axially of the face plate. A tool post 34, carrying the cutters 19 and 21, is mounted on the saddle for movement therewith in a direction axially of the chuck 20 for feeding of the cutters toward the blank. In the specific embodiment, the chuck is provided with a plurality of work holding vises so that a plurality of blanks may be automatically machined in a single operation. Inasmuch as all of the vises are identical as is their method of operation, in the interests of brevity, only one vise 18 has been shown and will be described in detail.

An air motor 35 on the lathe feeds the saddle 32 toward and away from the chuck, and a feed control mechanism 36 actuated by a cam 40 carried by the faceplate permits a predetermined increment of movement of the saddle toward the chuck by the air motor 35 for each revolution of the chuck. The apparatus of this invention is shown in combination with a lathe, merely by way of example, for as will be hereinafter apparent, other types of machines, such as a drill press, could be utilized without departing from the scope of the invention.

The chuck 20, as shown in Figs. 8 to 11, comprises a body having a front housing 38 and a rear housing 44. The front housing 38 is provided with a plurality of spaced apart apertures 41 circularly arranged about the clutch axis and in which the shank 42 of each vise 18 is received. The rear housing 44 is also provided with a plurality of apertures registerable with the apertures 41 for receiving the shank 42 of the vise. The shank is journaled in bearings engaged in counterbores in the apertures in the front and rear housings. A plurality of socket head bolts secure the front and rear housings in assembly, and the rear housing, as is usual, is provided with a recess for receiving the face plate of the lathe. The front and rear housings are both recessed to provide an internal recess 46 within the chuck in which is disposed the vise indexing mechanism.

Figure 9:
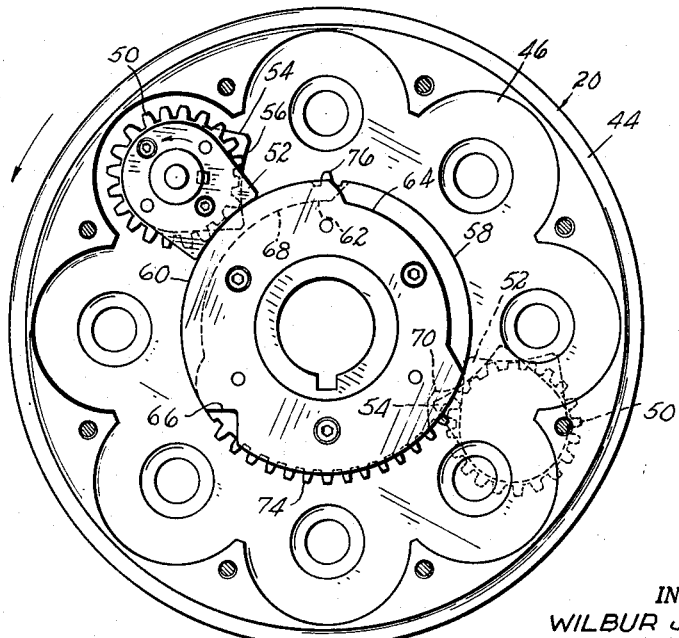
Fig. 9 is a front elevational view of the chuck similar to Fig. 8 with a portion of the chuck removed to illustrate internal elements.

With reference to Figs. 9 and 10, disposed within the internal recess 46 is a planet gear 50 which is mounted on and keyed to a shank 42 for rotation therewith. For reasons which will be hereinafter apparent, a pair of locking plates 52, 54 are mounted on opposite faces, respectively, of the gear 50 for rotation therewith. The plates are angularly displaced approximately 40° relative to each other about the axis of the planet gear and each plate is provided with an arcuate bearing surface 56. The teeth of the planet gear registering with the surfaces 56 are mutilated insofar as is necessary to prevent these teeth from extending beyond the surfaces 56.

An interrupted tooth sun gear 58 is disposed within the internal recess 46 coaxially of the chuck for intermittent engagement with the planet gear 50 in a manner to be described. Mounted on opposite faces, respectively, of the sun gear, for rotation therewith, are a pair of locking discs 60, 62 for cooperation with the locking plates 52, 54 respectively, for reasons which will be later apparent, the locking disc 60 is provided with a peripheral notch 64 extending a relatively large distance about the periphery of the disc and also with a relatively short peripheral notch 66 generally opposite the notch 64. The disc 62 is also provided with a relatively long notch 68 in its periphery and with a relatively short peripheral notch 70 generally opposite to the notch 68. The locking disc 62 and sun gear 58 are each provided with a central aperture for receiving an arbor 72 which, as seen in Fig. 10, is fixed on the tool post 34. The arbor 72 is keyed to the sun gear 58 whereby during rotation of the chuck, the sun gear and locking discs will be held stationary. An elongated slot 73 in the arbor permits movement of the arbor axially of the sun gear for feeding of the tool post.

With the chuck body in the rotated position relative to the sun gear as shown in Fig. 9, the arcuate bearing surface 56 of the locking plate 52 will, during counterclockwise rotation of the chuck body, be in sliding engagement with the periphery of the locking disc 60 to prevent rotation of the planet gear during a predetermined amount of chuck rotation. The notch 68 in the locking disc 62 prevents interference of the plate 54 and disc 62 at this time. When the planet gear engages the relatively long toothed portion 74 of the sun gear, the planet gear will be rotated in a counterclockwise direction and the notch 66 in the locking disc 60 precludes interference between the disc 60 and plate 52 at this time. In accordance with the above described mode of operation, the sun gear toothed portion 74 will provide approximately 320° rotation of the planet gear whereupon the arcuate bearing surface 56 of the locking plate 54 will now be in engagement with the locking disc 62 to prevent further rotation of the planet gear. The notch 70 in the disc 62 precludes interference of the plate 54 and disc 62 during final rotation of the plate 54 into locking sliding engagement with the disc 62 as shown in phantom in Fig. 9. The notch 64 in the disc 60 precludes interference of the plate 52 and disc 60 during movement of the plate 54 into engagement with disc 62 as well as during sliding engagement between the plate 54 and disc 62.

Continued counterclockwise rotation of the chuck body will result in engagement of the planet gear 50 with the tooth 76 of the sun gear to effect rotation of the planet gear approximately 40° in a counterclockwise direction, whereupon the sun gear and locking plates will again be in the relatively rotated position of Fig. 9. Thus, it can be seen that the chuck, constructed in accordance with this invention, provides a very simple yet accurate method of providing the desired indexing of the vise 18 relative to the cutters 19 and 21 after each engagement of the blade blank with a cutter.

With reference to Figs. 6, 7, and 10-14, the feed control mechanism for the tool post comprises a rear housing 78 secured to the lathe bed by clamp 80 and a front housing 82, also secured to the lathe. A shaft 84 is journaled in a bearing supported in a rear housing and extends in a direction axially of the chuck. A pinion 86 is mounted on the shaft 84 for rotation therewith and engages a rack 88 slidably mounted in a recess in the rear housing. A cam or wedge 90 is carried by the rack and, as shown in Fig. 6, is engageable by a roller 92 adjustably mounted on the saddle for movement therewith, whereby as the cam is moved relative to the lathe, the saddle will be permitted to be advanced toward the chuck. A thumb screw adjustment 94, as shown in Fig. 6, permits fine adjustment of the saddle relative to the cam in any position of the cam.

Figure 11:
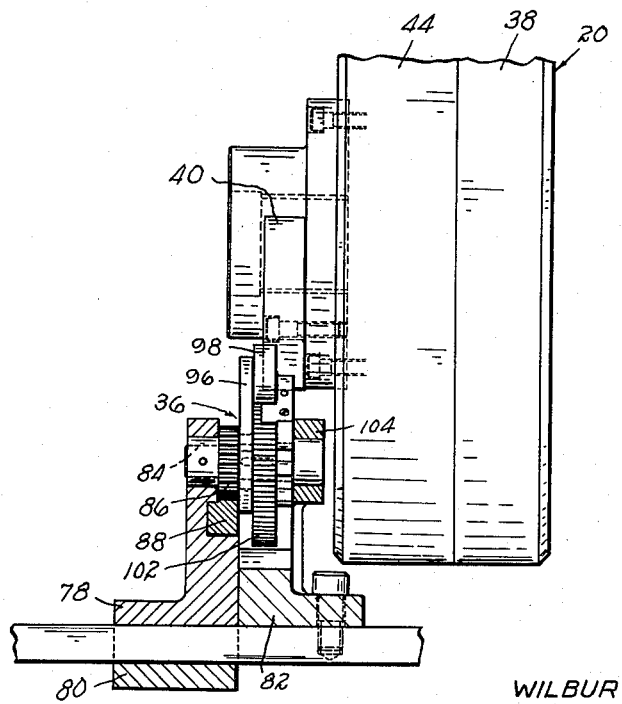
Fig. 11 is an enlarged fragmentary side elevational view partly in section of the tool feed control mechanism and chuck of Fig. 6.

A ratchet lever 96 is rotatably mounted on the shaft 84 and carries a roller 98 engageable with the cam 40 carried by the face plate on which the chuck is mounted. The ratchet lever also carries a pivoted pawl 100 engageable with a ratchet gear 102 mounted on the shaft 84 for rotation therewith. The other end of the shaft 84 is journaled in a bearing mounted in a boss 104 on the front housing 82. With particular reference to Fig. 11, it can be seen that during rotatio of the chuck, the high point of the cam 40 will, once each revolution of the chuck, rock the ratched lever 96 to advance the ratched gear one tooth in a clockwise direction so as to move the cam 90 to the left a predetermined distance and thus permit an increment of feeding of the tool post. In the preferred embodiment, after a predetermined feed of the tool post, a suitable switch, not shown, is engaged by the saddle to reverse the air motor 35 and retract the saddle. A second switch, not shown, is engageable by the rack 88 subsequent to the initial retracting movement of the saddle, to retract the rack 88 to the right as viewed in Fig. 12 and reset the feed control mechanism. The retraction of the rack is accomplished by an air motor 104, which as shown in Fig. 7, is supported on the lathe and has a piston rod engaged with the rack. Further, a third switch, not shown, is preferably engageable by the saddle upon complete retraction thereof to render the air motor 35 ineffective to move the saddle to permit removal of the blades and replacement with additional blanks.

Figure 14:
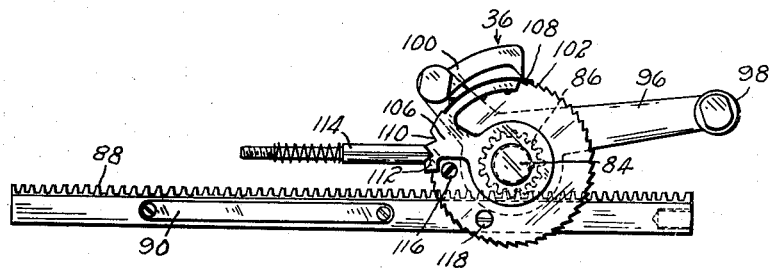

To prevent interference of the pawl 100 and ratchet gear 102 during retraction of the rack, a pawl shield 106 is rotatably mounted on the shaft 84 and is provided with an arcuate plate 108 engageable with the pawl to lift the pawl out of engagement with the gear 102 as shown in Fig. 14.

Figure 12:
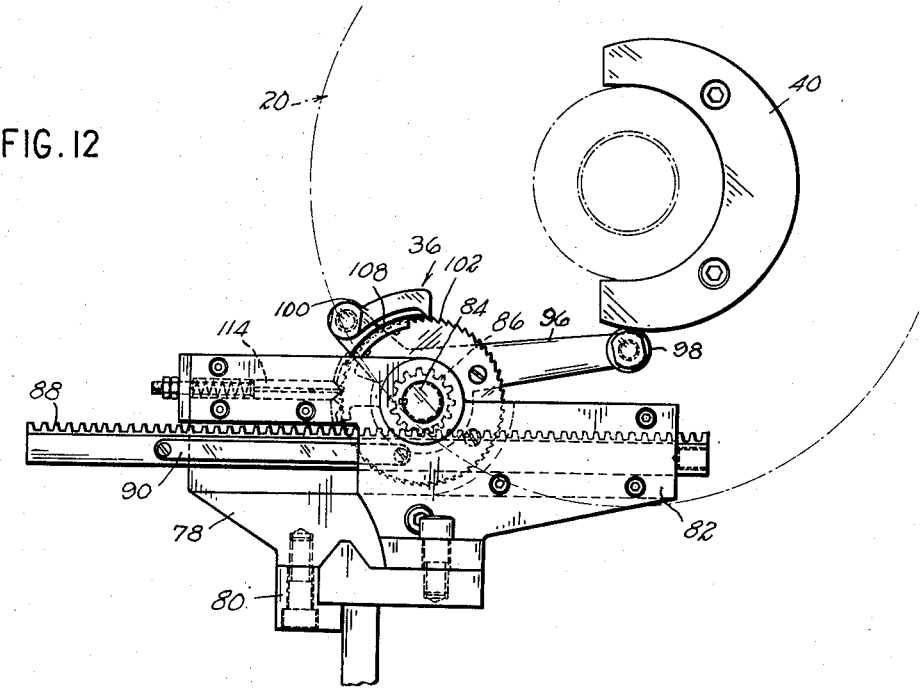
Fig. 12 is a front elevational view of the tool feed control mechanism of Fig. 11.
Figure 13:
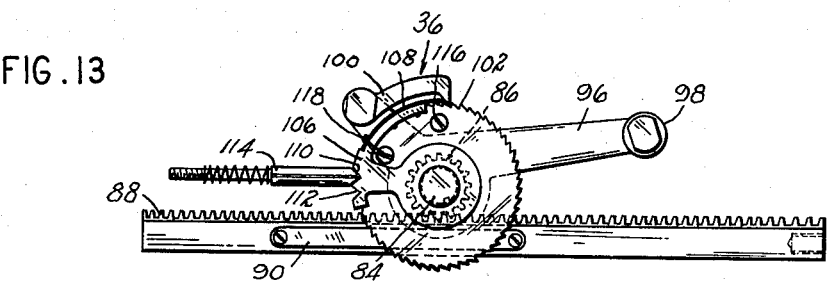
Figs. 13 and 14 are front elevational views of a portion of the feed control mechanism of Fig. 12 illustrating the operation thereof.

The pawl shield is provided with a pair of side by side notches 110, 112 engageable by a spring biased plunger 114 to lock the shield in either pawl engaging or pawl disengaging position and further to assist in moving the shield between these two positions. With reference to Figs. 12 and 14, sufficient clockwise rotation of the ratchet gear will engage a pin 116 mounted on the gear with the pawl shield to rotate the shield in a clockwise direction. The plunger 114 will then be cammed out of engagement with the notch 110, and subsequent to registry of the plunger with the high point between the notches, will cam the shield in a clockwise direction relative to the ratchet gear and pawl so that the plate 108 will lift the pawl out of gear engagement. Just prior to the completion of a subsequent retraction of the rack to the right, as viewed in Fig. 13, a second pin 118, also carried by the ratchet gear, will engage the pawl shield as shown in Fig. 13 to rotate the shield in a counterclockwise direction out of pawl engagement, and cam the plunger 114 back into the notch 110.

It can be seen that there has been provided a novel method for fabricating saw blades having teeth which are alternately fleamed in opposite directions. In addition, teeth having any desired rake may be produced by this method. The method is particularly adapted to the mass production of such blades, thus enabling the fabrication of the blade at a relatively low cost. Further, by means of one embodiment of the method of this invention, a saw blade of the type described having "hollow ground" teeth may be produced at no increase in cost. The apparatus of this invention is relatively simple, and is adapted to produce saw blades on a mass production basis to a relatively high degree of accuracy and at a relatively low cost. The apparatus is rugged to assure extended trouble-free operation and is easily adapted for use on various types of machines.

We claim:

1. A method of fabricating a saw blade of the type having alternately oppositely fleamed teeth comprising causing relative movement of a blade blank and form cutter means transversely of each other to partially form sequentially along the blank in one pass of the blank and cutting means the faces of the teeth fleamed in one direction and the backs of the teeth fleamed in the other direction, subsequently causing relative movement of the blank and second form cutter means transversely of each other to partially form sequentially along the blank in one pass of the blank and said second cutter means the faces of the teeth fleamed in said other direction and the backs of the teeth fleamed in said one direction, causing relative movement of the blank and the first- and second-mentioned cutter means for depth of cut, and repeating the cycle until a predetermined depth of cut has been achieved.

2. A method of fabricating a saw blade of the type having alternately oppositely fleamed teeth comprising causing relative movement of a blade blank and form cutter means transversely of each other to partially form sequentially along the blank the faces of the teeth fleamed in one direction and the backs of the teeth fleamed in the other direction, subsequently causing relative movement of the blank and second form cutter means transversely of each other to partially form sequentially along the blank the faces of the teeth fleamed in said other direction and the backs of the teeth fleamed in said one direction, effecting a variation in the relative disposition of the blank and the first- and second-mentioned cutter means during engagement therebetween to vary the fleam angle of the faces formed by said the first- and second-mentioned cutter means, causing relative movement of the blank and said first- and second-mentioned cutter means in increments for depth of cut, and repeating the cycle until a predetermined depth of cut has been achieved.

3. A method of fabricating a saw blade of the type having alternately oppositely fleamed teeth comprising causing relative movement of a blade blank and a form cutter transversely of each other with the blank offset from the cutter a predetermined angular distance to partially form sequentially along the blank in one pass of the blank and cutter the faces of the teeth fleamed in one direction and the backs of the teeth fleamed in the other direction, angularly indexing the blank subsequent to engagement with the cutter to present the blank to a second form cutter offset from said second cutter a predetermined angular distance, causing relative movement of the blank and second cutter transversely of each other to partially form sequentially along the blank in one pass of the blank and second cutter the faces of the teeth fleamed in said other direction and the backs of the teeth fleamed in said one direction, causing relative movement of the blank and cutters for depth of cut subsequent to engagement of the blank with the first cutter and prior to engagement with the second cutter, and repeating the cycle until a predetermined depth of cut has been achieved.

4. A method of fabricating a saw blade of the type having alternately oppositely fleamed teeth comprising causing relative movement of a blade blank and form cutter transversely of each other with the blank offset from the cutter a predetermined angular distance to partially form sequentially along the blank the faces of the teeth fleamed in one direction and the backs of the teeth fleamed in the other direction, subsequently causing relative movement of the blank and a second form cutter to partially form sequentially along the blank the faces of the teeth fleamed in said other direction and the backs of the teeth fleamed in said one direction, causing angular indexing of the blank relative to each cutter during engagement therebetween angularly indexing the blank relative to the first cutter subsequent to engagement therewith to cause initial engagement of the blank and second cutter with the blank offset from said second cutter a predetermined angular distance, causing relative movement of the blank and cutters for depth of cut subsequent to engagement of the blank with the first cutter and prior to engagement with the second cutter, and repeating the cycle until a predetermined depth of cut has been achieved.

5. A method of fabricating a saw blade of the type having alternately oppositely fleamed teeth comprising causing relative movement of a blade blank and a form cutter in a curvilinear path with the blank and cutter offset at initial engagement a predetermined angular distance to partially form sequentially along the blank the faces the teeth fleamed in one direction and the backs of the teeth fleamed in the other direction, subsequently causing relative movement of the blank and a second form cutter in a curvilinear path to partially form sequentially along the blank the faces of the teeth fleamed in said other direction and the backs of the teeth fleamed in said one direction, causing angular indexing relative movement of the blank subsequent to engagement with the first cutter to effect initial engagement of the blank with said second form cutter with the blank and second cutter offset a predetermined angular distance, causing relative movement of the blank and cutters for depth of cut subsequent to engagement of the blank and the first cutter and prior to engagement of the blank and second cutter, and repeating the cycle until a predetermined depth of cut has been achieved.

References Cited in the file of this patent

UNITED STATES PATENTS

| | | |
|---|---|---|
| 1,381,550 | Harkins | June 4, 1921 |
| 1,480,627 | Muller | Jan. 15, 1924 |
| 1,704,324 | Johannesmeyer | Mar. 5, 1929 |
| 1,732,692 | Peiseler | Oct. 22, 1929 |
| 2,002,442 | Swanson | May 21, 1935 |
| 2,183,363 | Zimmermann | Dec. 12, 1939 |
| 2,286,874 | Schwartz | June 16, 1942 |
| 2,589,050 | Carlson et al. | Mar. 11, 1952 |
| 2,643,584 | Wertepny et al. | June 30, 1953 |
| 2,669,163 | Sandkaulen | Feb. 16, 1954 |
| 2,685,735 | Sorensen | Aug. 10, 1954 |
| 2,756,643 | Prahauser | July 31, 1956 |